United States Patent [19]
Schneider

[11] Patent Number: 6,033,300
[45] Date of Patent: Mar. 7, 2000

[54] AUTOMOTIVE VEHICLE HVAC RAINHAT

[75] Inventor: Dean Jeffrey Schneider, Washington, Mich.

[73] Assignee: L & L Products, Inc., Romeo, Mich.

[21] Appl. No.: 09/176,357

[22] Filed: Oct. 21, 1998

[51] Int. Cl.$^7$ .................................................. B60H 1/30
[52] U.S. Cl. ............................ 454/147; 296/192; 454/78
[58] Field of Search .................................. 454/146, 147, 454/148, 82, 78; 296/192

[56] References Cited

U.S. PATENT DOCUMENTS

| | | | |
|---|---|---|---|
| 2,888,274 | 5/1959 | Premo | 454/146 |
| 4,466,654 | 8/1984 | Abe | 296/192 |
| 5,108,146 | 4/1992 | Sheppard | 296/192 |

FOREIGN PATENT DOCUMENTS

| | | | |
|---|---|---|---|
| 861234 | 1/1971 | Canada | 454/146 |

*Primary Examiner*—Harold Joyce
*Assistant Examiner*—Derek S. Boles
*Attorney, Agent, or Firm*—Dykema Gossett PLLC

[57] ABSTRACT

In a preferred embodiment, the present invention provides a high temperature injection molded polymeric rainhat for a heating, ventilation, and air-conditioning air intake of an automotive vehicle is provided. The rainhat includes a flange for adhesively and sealably joining to a portion of the generally planar automotive vehicle cowling encircling a flared air inlet opening. A water dam joined to the flange extends beyond an end of the flared opening. The water dam has an extreme upper edge forming an opening. A foreign matter ingestion preventer is also included. The foreign matter ingestion preventer has a plurality of first curvilinear supports extending in a first direction over the water dam upper edge opening. Each first support has opposite ends joined with the water dam, and each first support has a middle portion domed above the opening of the water dam. Each first support has a tapered exterior side. The foreign matter ingestion preventer also has plurality of second supports intersecting with the first curvilinear supports. Each second support has a middle portion being domed above the water dam. Each second support has a tapered exterior side. A surface area of the foreign matter ingestion preventer minus the surface area defined by the transverse dimensions of the first and second supports is generally equal to or greater than the area defined by the opening of the upper edge of the water dam.

18 Claims, 4 Drawing Sheets

AUTOMOTIVE VEHICLE HVAC RAINHAT

FIELD OF THE INVENTION

The field of the present invention is that of rainhats for heating, ventilation, and air-conditioning inlets on automotive vehicles.

BACKGROUND OF THE INVENTION

Virtually all vehicles manufactured today have a heating and ventilation system for the interior of the vehicle. Additionally, virtually all vehicles manufactured in North America also come equipped with an air-conditioning system. To facilitate the environmental health and comfort of the vehicle occupants, fresh air must be brought into the vehicle interior. Several technical challenges are presented in bringing in fresh air into the vehicle. First, the fresh air intake should be located in an area of the vehicle such that it cannot suck in any fumes from the engine compartment. Secondly, the fresh air intake should be positioned in a location that snow or frozen precipitation cannot clog it up. Additionally, the air intake should be protected so that precipitation and/or leaves or other various debris and does not enter into the heating, air-conditioning and ventilation system.

Most vehicles place the engine in the front end of the vehicle. Behind the engine compartment is a sealed interior of the vehicle which is provided by a fire wall. Above the fire wall and inclined rearwardly from the top of the fire wall is the windshield. Extending forwardly from the base of the windshield and on top of the fire wall is a generally flat region called the cowling. The cowling is covered by the rear portion of the front hood which also extends across the engine compartment. The lower portion of the hood has a seal molding which seals the engine compartment from the remainder of the cowling. However, the engine hood is spaced away from the windshield allowing air to enter into the cowling area from behind the front hood. Typically, the air intake for most vehicles is placed in the cowling area since the cowling area is opened to the atmosphere, covered by the front hood but yet sealed away from engine compartment by the molding of the front hood. The cowling typically has a flared opening for the air inlet for the heating, ventilation and air-conditioning system. Air from the air inlet is piped into the interior of the vehicle below the dashboard where it is appropriately heated, cooled and/or filtered to meet the environmental and comfort requirements of the vehicle occupants. Although the cowling is covered, it is exposed to the environment and rain falling down the windshield does enter the cowling area until it is diverted to the sides away from the cowling. To prevent the water which accumulates in the cowling area from entering into the inlet for the heating, ventilation and air-conditioning system, a rainhat is provided. Prior to the present invention, the rainhat included a tubular-shaped member having a bottom flat flange. The tubular shaped member was inserted over a flared opening of the cowling and was spot welded thereto. The area of contact of the rainhat flange with the cowling was sealed to prevent the inflow of water. After the tubular shaped member was weldably attached to the flared opening of the cowling, a screen had to be attached over the tubular shaped member to prevent the ingestion of leaves or other debris into the heating and ventilation system. The screen was weldably attached to an encircling metallic band. The metallic band was either fixed to the tubular shaped member by welding, fasteners or clips. The screen was joined along its sides to the metallic band and typically had a generally flat top end.

Prior rainhats suffered from several problems. The first problem was the cost. The prior rainhat had a tubular shaped member, a metal band, three clips and a wire mesh screen. The screen (and encircling metallic band) could not be placed on the tubular shaped member until the tubular shaped member was assembled into the vehicle since the spot welding guns had to be inserted within the tubular shaped member during the fabrication process. Additionally, it was not uncommon for the spot welds to break. When the spot weld breaks, typically a portion of the tubular shaped member or of the flared opening is torn leaving a crack which gives a potential for the ingestion of rain water into the heating, ventilation and air-conditioning system air intake. To protect the ends of the screen, the screen was usually inserted into the encircling metallic band. This allowed a potential gap between the screen and the top end of the encircling metallic band to be created. The above noted gap could allow for the entry of leaves or other debris which could then become stuck and clog up the air intake opening by being sucked against the screen.

It is desirable to provide a rainhat which can be affixed with the flared opening of the cowling without the expense of a welding operation. It is also desirable to provide a rainhat which is cheaper to manufacture. It is still another desire to provide a rainhat which is lighter allowing the vehicle to have an increase in gas mileage and thereby increase the environmental efficiency of the vehicle.

To meet the above-noted desires, the revelation of the present invention is brought forth. The present invention provides the freedom of a single integral rainhat which may be adhesively and sealably connected with an automotive vehicle without the utilization of any welding. Furthermore, in a preferred embodiment, the present invention brings forth a high temperature injection molded polymeric rainhat which can be fabricated in a single draw injection machine. Furthermore, the present invention provides a rainhat which is cheaper, easier to install and which additionally can be formed in a shape which discourages the entrapment of leaves or other articles which can clog up the openings.

In a preferred embodiment, the present invention provides a high temperature injection molded polymeric rainhat for a heating, ventilation, and air-conditioning air intake of an automotive vehicle having a cowling with a generally planar surface encircling a flared opening. The rainhat includes a flange for adhesively and sealably joining to a portion of the generally planar cowling encircling the flared opening.

A water dam is integrally joined to the flange and is extending therefrom. The water dam has an interior surface closely engaging the flared opening of the cowling and extends upwards beyond a vertical end of the flared opening. The water dam has an extreme upper edge forming an opening. A foreign matter ingestion preventer is also included. The foreign matter ingestion preventer has a plurality of first curvilinear supports extending in a first direction over the water dam upper edge opening. Each first support has opposite ends joined with the water dam, and each first support has a middle portion domed above the opening of the water dam. Each first support has a tapered exterior side. The foreign matter ingestion preventer also has plurality of second supports intersecting with the first curvilinear supports. Each second support has a middle portion being domed above the water dam. Each second support has a tapered exterior side. A surface area of the foreign matter ingestion preventer minus the surface area defined by the transverse dimensions of the first and second supports is generally equal to or greater than the area defined by the opening of the upper edge of the water dam.

It is an object of the present invention to provide an injection molded rainhat for the air intake of an automotive heating, ventilation and air-conditioning system.

The above-noted objects and other advantages of the present invention will become more apparent to those skilled in the art as the invention is further explained in the accompanying detailed description and drawings.

BRIEF DESCRIPTION OF THE DRAWINGS

FIG. 6 is an enlargement of the intersection between a support extending in a first direction and a support extending in a second direction encircled in FIG. 4.

FIG. 6A is an enlargement of the intersection between a support extending in a first direction and a rafter extending in a second direction encircled in FIG. 4.

FIG. 7 is an enlarged view of the barbed end fastener of the present invention which is encircled in FIG. 1.

FIG. 8 is a sectional view taking along line 8—8 of FIG. 2 illustrating the mechanical interlocking and adhesive attachment of the adhesive to the flange of the rainhat.

DETAILED DESCRIPTION OF THE PREFERRED EMBODIMENT

Figure 1:
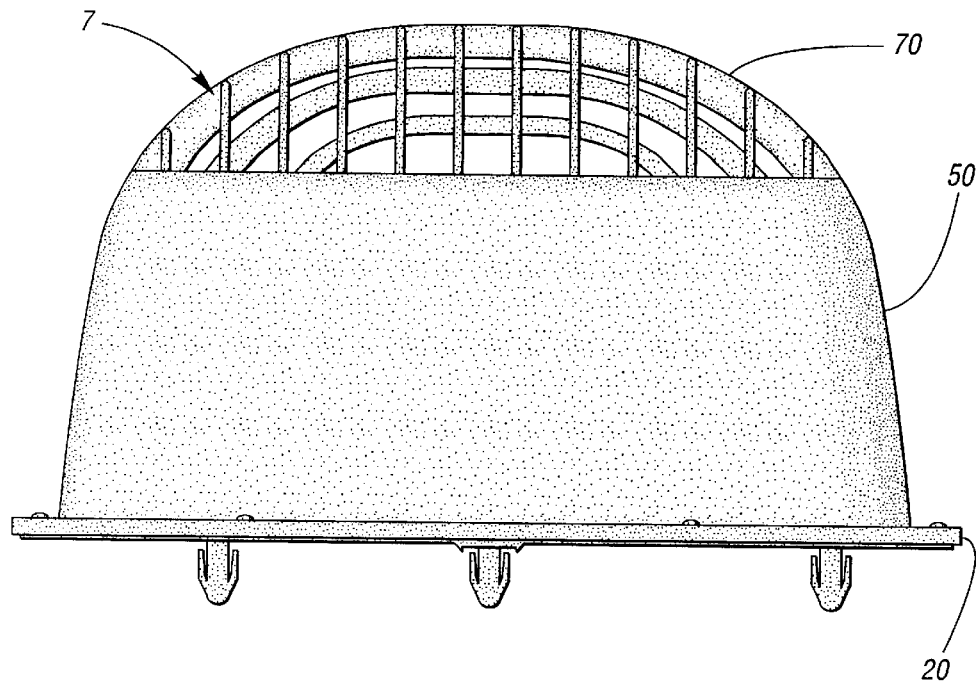
FIG. 1 is a front elevational view of a high temperature injection molded polymeric rainhat for a heating, ventilation, and air intake for an automotive vehicle according to the present invention which includes a flange, a water dam, and a foreign matter ingestion preventer.

Referring to FIGS. 1–4, a cowling 8 (FIG. 4) of an automotive vehicle is shown in phantom. The cowling 8 is positioned forward the vehicle windshield underneath the hood which covers the vehicle engine compartment. At least a portion of the cowling 8 provides a generally planar surface 10. The generally flat surface 10 portion of the cowling encircles a flared opening 12. The flared opening 12 receives air for the vehicle heating, ventilation and air conditioning system.

The high temperature injection molded polymeric rainhat 7 of the present invention is made from a high temperature polymeric substance thermoplastic such as polyamide, poly (phenylene sulphide), poly (butylene terephthalate) or other temperature resistant thermoplastic materials. The material should pass a 205° C. temperature test without significant distortion or degradation of the polymeric material. This will enable the rainhat 7 to pass through the electrocoat curving oven and still maintain its functional integrity. In addition, the rainhat 7 material must be capable of passing through a phosphate immersion tank without being damaged. A particularly preferred material commonly known as Nylon sold under the trademark Zytel, and is manufactured by Dupont located in Wilmington, Del. Other important rainhat 7 material characteristics include impact strength, elastic modulus, tensile strength, and elastic strain to failure. Specific requirements for the above characteristics will depend on specific design and attachment methods. The rainhat 7 has a flange 20. The flange 20 joins the rainhat to the planar surface 10 portion of the cowling which encircles the flared opening.

To provide a semi-structural bond to adhesively and sealably join the flange 20 to the planar surface 10 portion of the cowling, the flange 20 has connected therewith an adhesive 22 (FIG. 8). The adhesive 22 is formed from a thermosetting formulated adhesive with a synthetic polymer base which may incorporate magnetizable particles but in general does not. The adhesive (1) may provide a strong magnetic field; (2) melts at temperatures encountered in automotive paint ovens (between about 100 and 235° C.) in order to flow over and around the generally planar surface 10 portion of the cowling to be sealed; (3) bonds well to metal of the cowling; and (4) partially expands to fill any opening between the flange 20 and the generally planar surface 10 portion of the cowling encircling the flared opening 12. In addition, the adhesive 22 should pass any specifications determined to be important to the automotive manufacturer that may include, but are not limited to, corrosion resistance, adhesive strength, toxicity, expansion, etc. Most preferably, the adhesive 22 is a hot melt sealant that volumetrically expands to some extent during curing.

The adhesive 22 includes as one component a synthetic polymer resin or a blend of resins and preferably includes one or more elastomers. In one embodiment, where magnetic particles are, the adhesive 22 contains a polyolefin resin, a combination of ethylene vinyl acetate copolymer (EVA) and an acrylic resin such as ethylene methyl acrylate.

A cross-linking or curing agent is also preferably included in the adhesive 22 to cross-link the polyolefin. The cross-linking agent should provide a reasonable shelf life, but should also be fully activated at the temperatures encountered in the curing environment of an automotive paint oven. A tackifier component is also included in the adhesive 22 to provide adhesion and to enhance peel strength.

The adhesive 22 further may include ferritic magnetic particles which can provide the magnetic field that retains the rain hat flange 20 in position on the flat surface 10 portion of the cowling. In a more preferred embodiment, the adhesive 22 further includes a multifunctional cross-linking monomer such as trimethylolpropane trimethacrylate or trimethylolpropane triacrylate to increase the cross-linking density of the adhesive 22. Additionally the adhesive 22 has an expansion agent which produces expansion of the adhesive 22 when it is melted in the automotive paint oven to provide a more uniform and reliable seal of rain hat flange to the generally planar portion of the cowling. Furthermore, the adhesive 22 includes a blowing agent which is thermally-activated. The blowing agent should be fully activated at about 100 to about 200° C.

The adhesive should have a melt index that allows it to flow sufficiently during the sealing operation. A more detailed explanation of the adhesive can be gained from a review of U.S. patent application Ser. No. 08/590,009 Czaplicki et al., the specification of which is incorporated by reference herein. However, other suitable sealants can be utilized such as those commercially available from L & L Products. Suitable formulated materials include L-4200, L-2100 and L-4141.

Referring additionally to FIG. 8, the adhesive 22 is adhesively joined to a bottom surface 24 of the flange 20. The flange 20 has a plurality of vertically transverse bores. The adhesive 22 is molded to the flange 20 such that it flows through the bores 26 and forms a head 28 on the opposite flange top surface 30. The adhesive 22 is therefore also mechanically joined to the flange as well as adhesively joined thereto.

Referring additionally to FIG. 7, integral with the flange 20 and extending downward therefrom are three elongated fastener members 36. The fastener members 36 have a head 38 with compliant barbs 40. The compliant barbs 40 of the fastener members are extended through predrilled holes (not shown) in the cowling generally planar surface 10 portion and thereafter retain the rainhat 7 in position before the flange 20 is adhesively joined to the cowling planar surface 10 portion. A mound 41 is provided to supply additional adhesive in and adjacent a hole which has a straight depression (not shown) in the cowling planar surface 10. The rainhat flange 20 has one central forward fastener members 36. On a rearward side of the flange 20 there are two spaced apart fastener members 36. The fastener members 36 are inclined slightly forward to accommodate a draw angle 130 of the rainhat 7.

Figure 4:
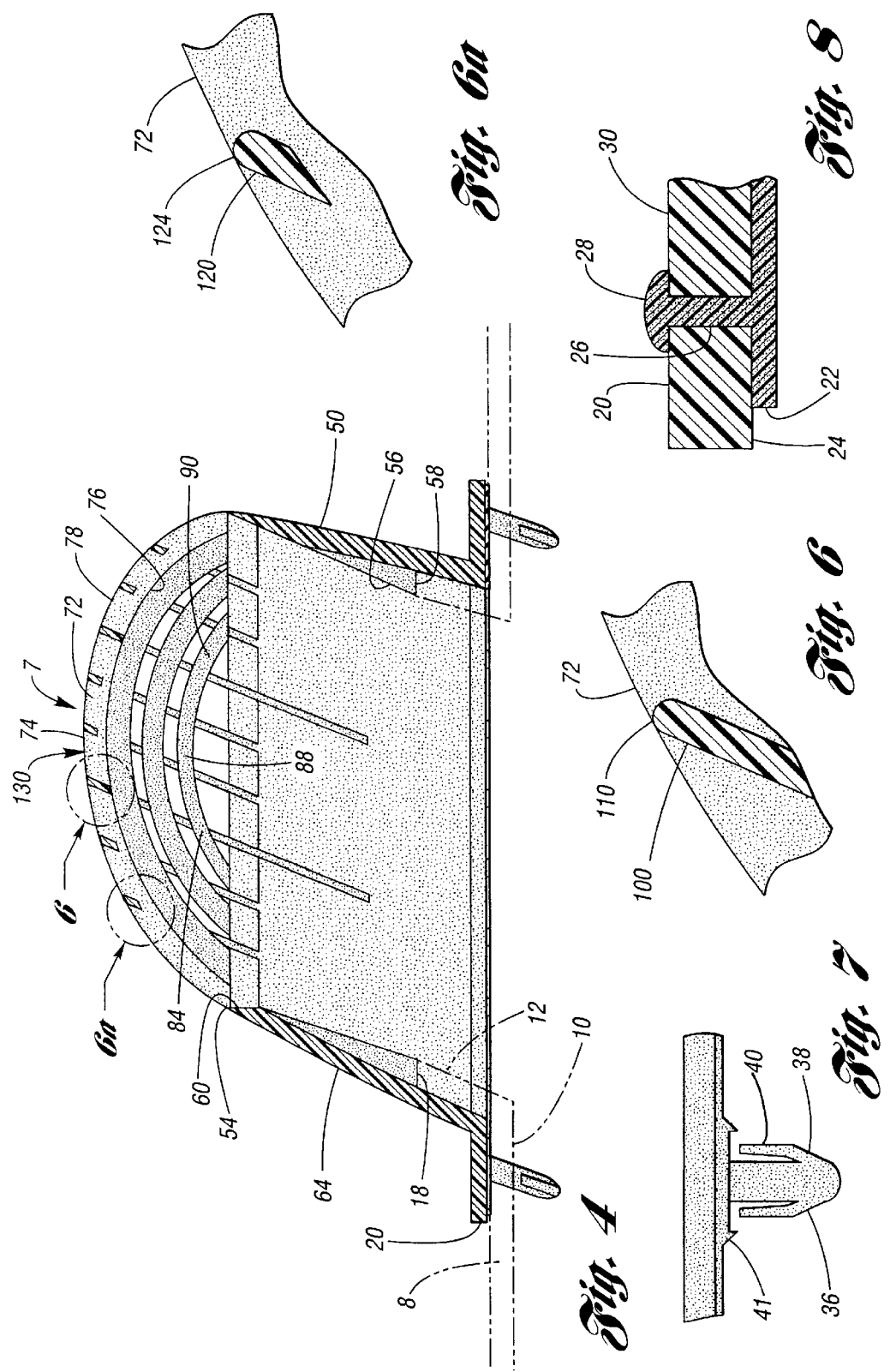
FIG. 4 is a side view similar to that of FIG. 2 with the rainhat being sectioned.
Figure 5:
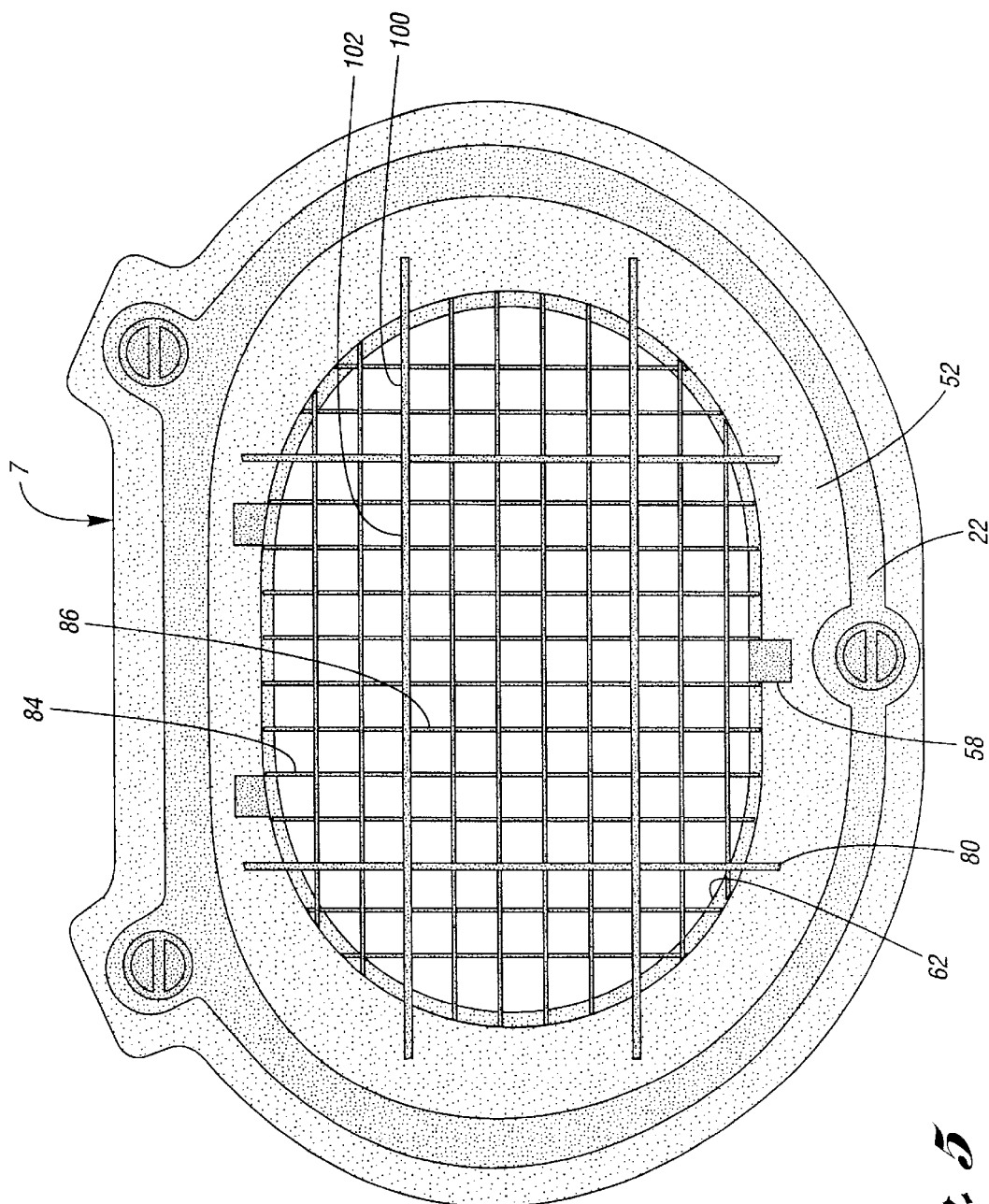
FIG. 5 is a bottom view of the rainhat aligned with the direction of airflow through the rainhat.

Integrally joined to the flange 20 and extending vertically upward therefrom is a water dam 50. The water dam has an interior surface 52 which closely engages the flared opening of the cowling. Any gap between the bottom portion of the rain dam interior surface 52 and the flared opening 12 of the cowling is also sealed by the adhesive 22, after it has been cured. The rain dam interior surface 52 also extends upward beyond a vertical end 18 of the flared opening. The water dam has an extreme upper knife edge 54 forming an opening 62. The interior surface of the water dam front end has a central interior stop 56 (FIGS. 4 and 5). The interior stop has a downward facing abutting edge 58 to make contact with the vertical end 18 of the flared opening 56. A rear wall of the water dam on its interior surface may have, as shown, two spaced apart interior stops to make contact with the vertical end 18 of the flared opening. The water dam interior surface 52 near an upper end is tapered at 60 to form the knife edge 54 with an exterior surface 64 of the water dam. The knife edge 54 aids in the prevention of leaves, leave stems or other debris laying on top the knife edge 54 of the rain dam. The opening 62 of the rain dam defines a predefined air inlet which is sufficient for the needs of the heating, ventilation and air conditioning system of the vehicle.

Figure 3:
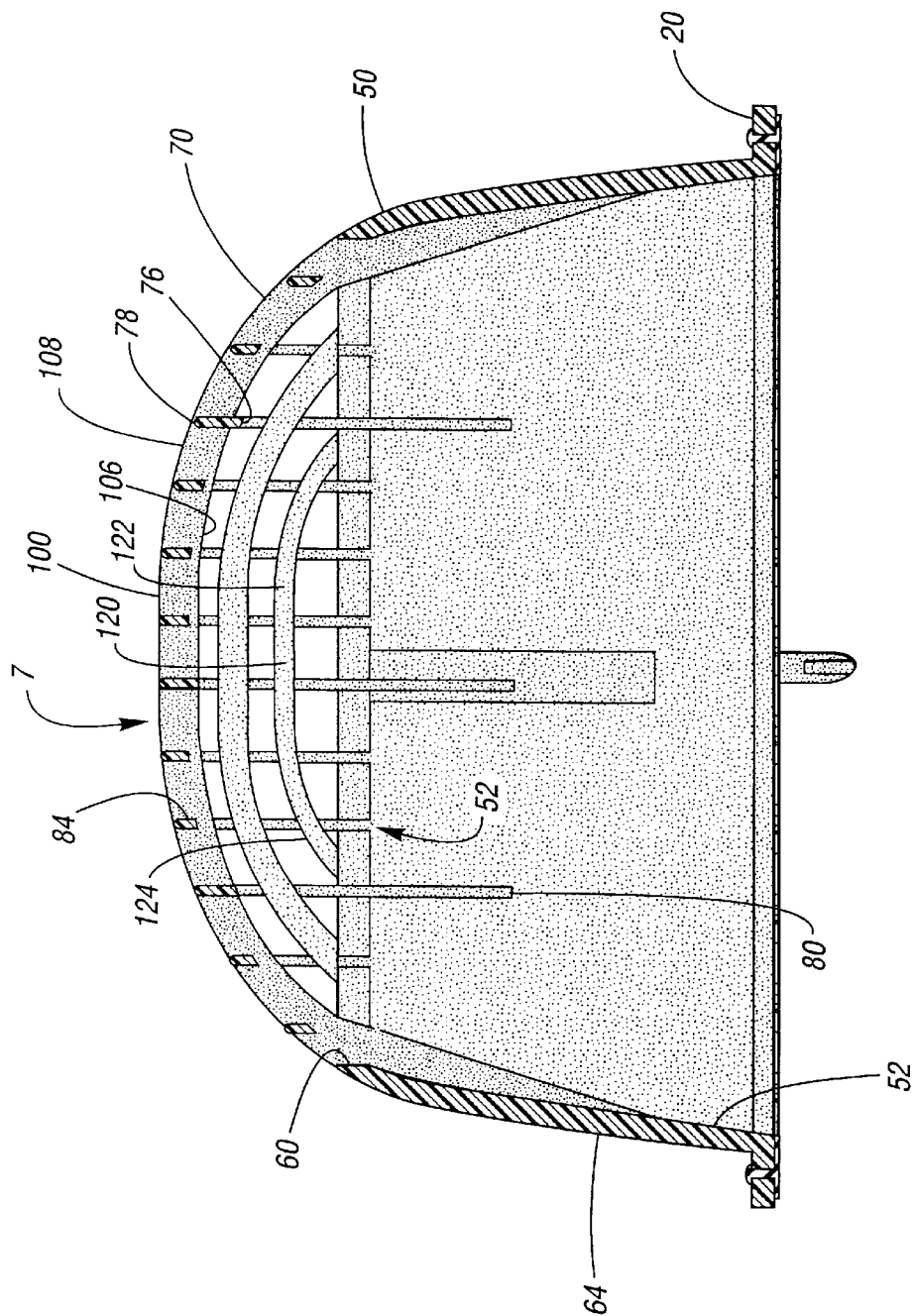
FIG. 3 is a front view similar to that of FIG. 1 with the rainhat being sectioned.

Positioned on top of the water dam is a foreign matter ingestion preventer 70. The foreign matter ingestion preventer 70 has a plurality of first curvilinear supports 72 extending in a first direction over the water dam opening 62. Each first support 72 is curvilinear having opposite ends joined with the water dam 50. Each first support 72 has a middle portion 74 domed above the opening 62 of the water dam. In the first direction there are three spaced apart supports 72. In other embodiments (not shown) the number of first supports may vary. (See FIGS. 3 and 5, note the middle first support has been removed from FIG. 5 for clarity of illustration). Each of the first supports 72 have an interior side 76 and an exterior side 78. The exterior side 78 of each first support is tapered and has a generally rounded edge. The exterior side 78 of the first support at an end of the first support is flush with the exterior surface 64 of the upper edge of the rain dam. The interior of each first support optionally extends downwardly into the interior surface 52 of the water dam as shown in FIGS. 3 and 5. The interior edge 80 of the first support does not extend far enough downward to contact the upper end 18 of the flared opening. The first supports are typically 2 millimeters thick with a height of 6 millimeters.

Extending generally parallel to the first supports in the first direction are a plurality of first rafters 84. (Note: Some first rafters 84 have been removed from FIGS. 3 and 4 for clarity of illustration). As shown in FIG. 5, the rain hat 7 has twelve first rafters 84, however more first rafters 94 may be included as desired. Each first rafter 84 has opposite ends joining with the water dam. Typically the first rafters will also be curvilinear in shape with a middle portion 86 being domed above the opening 62 of the water dam. Each first rafter 84 has an interior side 88. Each first rafter also has an exterior side 90. The exterior side of each first rafter 90 is tapered in a manner similarly described for the first supports. An interior side 88 of the first rafter are flush with an interior surface 52 of the water dam.

Extending from side to side are two curvilinear second supports 100 (FIGS. 3, 4 and 5). In other embodiments (not shown) the number of second supports may vary. The second supports are generally perpendicular with the first supports. Each second support 100 has a middle portion 102 extending over the water dam opening 62 with opposite ends joined to the water dam 50. Each second support has an interior side 106. Each second support has an exterior side 108. The exterior side 106 of each second support is tapered and has a generally rounded edge 110 (FIG. 6). The second support exterior side 106 is flush with the exterior surface 64 of the water dam. The second support exterior side 106 is also flush with the exterior side 78 of the first support 72 and of the first rafters exterior side 90. The second support are 2 millimeters thick with a height of 6 millimeters.

The rainhat additionally has second rafters 120. (Note: Some of the second rafters have been removed from FIGS. 3 and 4 for clarity of illustration). The second rafters 120 of the rainhat extend in a second direction generally parallel to the second supports 100. The second rafters have opposite ends joining with the water dam 50. The second rafters have a curvilinear shape with a middle portion 122 being domed above the opening 62 of the water dam (FIG. 5). Each second rafter 120 has an interior side. Each second rafter also has an exterior side 122. An exterior side 124 of the second rafter is flush with the exterior surface 64 of the water dam. The exterior side 124 of the second rafters is also flush with the first supports 72 and the first rafters at their intersection. The second rafters exterior side 126 (FIG. 6a) is tapered and has a particularly round end shape. The interior side 122 of the second rafters is flush with the interior surface 52 of the water dam.

The intersection of the first supports 72 and rafters 84 with the second supports 100 are essentially as shown in FIGS. 6 and 6a, for the intersections of the second supports 100 and rafters 120 with the first support 72.

Figure 2:
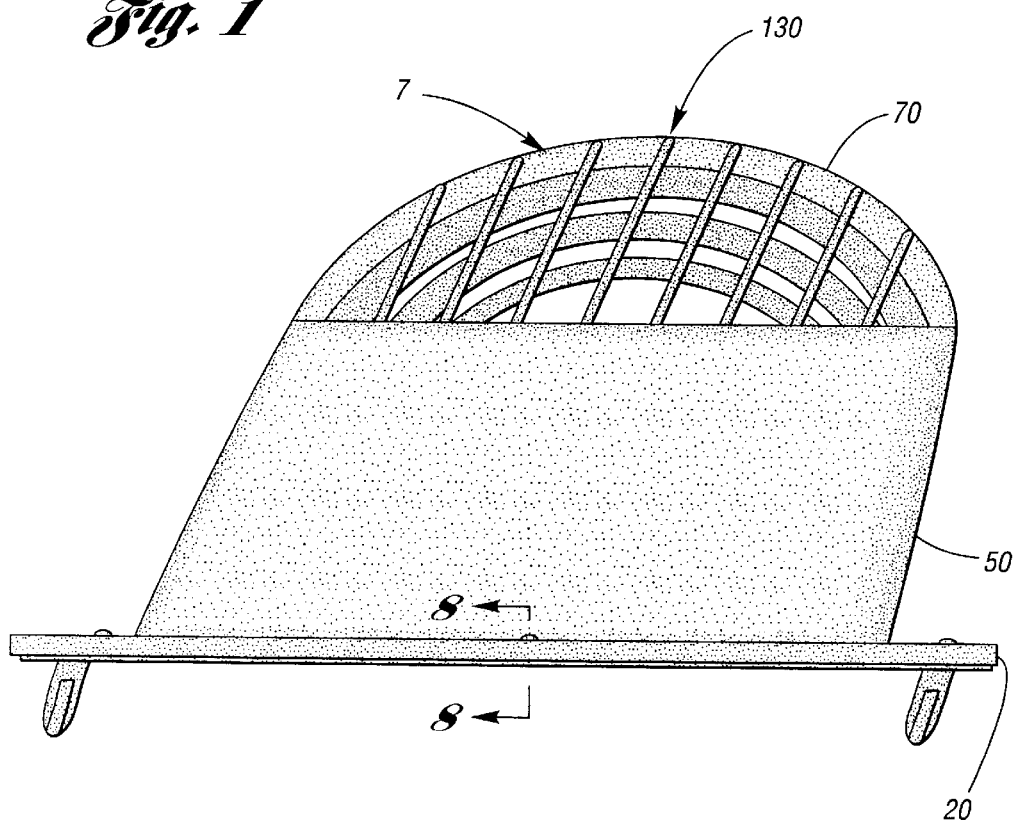
FIG. 2 is a side elevational view of the rainhat show in FIG. 1.

The rainhat 7 can be molded in a single draw mold machine. As shown, the main body of the rainhat 7 flange water dam and foreign matter ingestion preventer is molded in a single draw mold machine The first and second supports 72, 100 are perpendicular with one another when looked (projected) in a plane perpendicular to the direction of the draw of the mold which is used in forming the rainhat. The draw of the rainhat is generally parallel with the direction 130 of air inflow travel as shown in FIGS. 2 and 3. Slides are typically used to form the fastener member 36.

The surface area of the foreign matter ingestion preventer 70 minus the transverse area of the first support 72, second support 100, first rafters 84 and second rafters 120 is equal to or greater than the area of the opening 62 along the rain dam upper edge. To further aid airflow and to minimize fluid friction, the first and second rafters 89, 120 and supports 72, 100 have an exterior side edge which are tapered as previously mentioned. It has been empirically found that the tapering of the first and second supports 72, 100 and first and second rafters 84, 120 improves airflow approximately 10%. Still another factor which effects airflow is the tapering of the knife edge 54 of the rain dam. The tapering serves two functions. The first function is the minimization of air friction. The second function is as previously mentioned, it prevents debris from being lodged upon the knife edge 54. Additionally, leaves or other debris which fall upon the rainhat 7 will have a tendency to become unbalanced and fall off due to the three axis curvilinear features of the foreign matter ingestion preventer 70. The dome of the foreign matter ingestion preventer allows the supports and rafters to be thicker yet still provide an opening with the low flow resistance required. Thicker supports and rafters are desired due to increased strength, durability, and moldability.

In operation, the rainhat 7 is typically manually positioned over the flared opening 12 of the cowling. The rainhat 7 is pushed downward allowing the fastener members 36 to enter into the predrilled openings of the cowling 8. The barbs 40 of the fastener members 36 are contracted by the holes in the cowling planar surface 10 portion. Once past the holes the fastener member barbs 36 again extend to then capture the rainhat 7 to the cowling. The vehicle is then taken into an electrolyte bath. The rising of temperature caused by the paint ovens after the electrolytic bath causes the adhesive 22 to expand and to adhesively and sealably connect the rainhat 7 to the vehicle cowling. The barbed fasteners retain the rainhat 7 in position until the curing and expanding process of the adhesive 22 is complete.

While the present invention was illustrated and described with respect to a preferred embodiment, such description is exemplary only and not limiting in nature. Other aspects, objects, and advantages of this invention may be obtained from the study of the drawings, and the disclosure. It is well understood by those skilled in the art that various changes and modifications can be made in the invention without departing from the spirit and scope thereof, which is limited only by the appended claims.

What is claimed is:

1. A high temperature injection molded polymeric rainhat for a heating, ventilation, and air-conditioning air intake of an automotive vehicle, the vehicle having a cowling with a generally planar surface, the planar surface encircling a flared opening in the cowling, the rainhat comprising:

a flange for adhesively and sealably joining to a portion of the generally planar surface encircling the flared opening;

a water dam integrally joined to the flange and extending therefrom, the water dam having an interior surface closely engaging the flared opening of the cowling and extending upwards beyond a vertical end of the flared opening, and the water dam having an extreme upper edge forming an opening; and a foreign matter ingestion preventer, the foreign matter ingestion preventer having at least one first curvilinear support extending in a first direction over the water dam upper edge opening, each first support having opposite ends joined with the water dam, and each first support having a middle portion being domed above the opening of the water dam upper edge, each first support having the interior side and an exterior side with the exterior side being tapered, the foreign matter ingestion preventer having at least one second curvilinear support intersecting with the first curvilinear support, the second curvilinear support extending in a second direction over the flared opening, and each second support having opposite ends joined with the water dam, and each second support having a middle portion being domed above the opening of the water dam, each second support having an interior side and an exterior side with the exterior side being tapered, wherein a surface area of the foreign matter ingestion preventer minus the surface area defined by the transverse dimensions of the supports is generally equal to or greater than the area defined by the opening of the upper edge of the water dam.

2. A high temperature injection molded polymeric rainhat as described in claim 1 with a plurality of first supports.

3. A high temperature injection molded polymeric rainhat as described in claim 2 with a plurality of second supports.

4. A high temperature injection molded polymeric rainhat as described in claim 1, wherein there is an axis of travel of airflow through the rainhat and the first and second supports form a rectangular image on a plane which is perpendicular to the axis of travel of airflow through the rainhat.

5. A high temperature injection molded polymeric rainhat as described in claim 1, further including first rafters generally parallel to the first support, the first rafters extending in a first direction over the opening of the water dam edge, each first rafter having opposite ends joining with the water dam, with a middle portion being domed above the opening of the water dam upper edge and each first rafter having an interior side and an exterior side, with the exterior side being tapered, the first rafters intersecting with the second curvilinear supports and wherein the area of the foreign matter ingestion preventer minus the surface defined by the transverse dimensions of the area of the first and second supports and first rafters is equal or greater to the area defined by the opening of the upper edge of the water dam.

6. A high temperature injection molded polymeric rainhat as described in claim 1, further including second rafters generally parallel to the second support, the second rafters extending in a second direction over the flared opening of the water dam upper edge, each second rafter having opposite ends joining with the water dam, with a middle portion being domed above the opening of the water dam upper edge and each second rafter having an interior side and an exterior side, with the exterior side being tapered, the second rafters intersecting with the first curvilinear supports and wherein the area of the foreign matter ingestion preventer minus the surface defined by the transverse dimension of the area of the first and second supports and second rafters is equal or greater to the area defined by the opening of the upper edge of the water dam.

7. A high temperature injection molded polymeric rainhat as described in claim 1, wherein the supports exterior surface is flush with the exterior surface of the upper edge of the rain dam.

8. A high temperature injection molded polymeric rainhat as described in claim 1, wherein an interior of the water dam has interior stops to make contact with an upper edge of the flared opening.

9. A high temperature injection molded polymeric rainhat as described in claim 1, wherein the flange has descending therefrom a plurality of elongated fastener members with compliant barbed heads for insertion into prepared holes in the cowling to connect the rainhat with the cowling before the rainhat is adhesively joined to the cowling.

10. A high temperature injection molded polymeric rainhat as described in claim 1, wherein the first and second rafters have an exterior which is flush with the exterior surface of the water dam.

11. A high temperature injection molded polymeric rainhat as described in claim 1, wherein the first and second rafters have an interior which is flush with an interior surface of the water dam.

12. A high temperature injection molded polymeric rainhat as described in claim 1, wherein an interior surface of the water dam is tapered to an interior surface of the water dam to form an upper edge.

13. A high temperature injection molded polymeric rainhat as described in claim 1, wherein a heat expanding sealant is adhesively and mechanically joined to the flange.

14. A high temperature injection molded polymeric rainhat as described in claim 1, wherein the rainhat is molded from Nylon.

15. A high temperature injection molded polymeric rainhat as described in claim 1, wherein the rainhat flange, water dam and foreign matter injection preventer are made in a single draw injection mold machine.

16. A high temperature injection molded polymeric rainhat for a heating, ventilation, and air-conditioning air intake of an automotive vehicle, the vehicle having a cowling with a generally planar surface, the planar surface encircling a flared opening in the cowling, the rainhat comprising:

a flange for adhesively and sealably joining to a portion of the cowling generally planar surface encircling the flared opening, the flange has descending therefrom a plurality of elongated fastener members with compliant barbed heads for insertion into prepared holes in the cowling to connect the rainhat with the cowling;

a heat expanding sealant adhesively and mechanically joined to the flange;

a water dam integrally joined to the flange and extending therefrom, the water dam having an interior surface closely engaging the flared opening of the cowling and extending upwards beyond a vertical end of the flared opening, and the water dam having an extreme upper knife edge forming an opening and an interior surface of the water dam is tapered to an exterior surface of the water dam to form the upper knife edge, and an interior surface of the water dam has interior stops to make contact with an upper edge of the cowling flared opening; and a foreign matter ingestion preventer, the foreign matter ingestion preventer having a plurality of first curvilinear supports extending in a first direction over the water dam upper edge opening, each first support having opposite ends joined with the water dam, and each first support having a middle portion being domed above the opening of the water dam upper edge, each first support having the interior side and an exterior side with the exterior side being tapered, and the first supports exterior side being flush with the exterior surface of the water dam the foreign matter ingestion preventer having a plurality of second curvilinear supports intersecting with the first curvilinear supports, the second curvilinear supports extending in a second direction over the water dam, and each second support having opposite ends joined with the water dam, and each second support having a middle portion being domed above the opening of the water dam, each second support having an interior side and an exterior side with the exterior side being tapered and the second supports exterior side being flush with the exterior surface of the water dam, the foreign matter ingestion preventer further including first rafters generally parallel to the first supports, the first rafters extending in a first direction over the opening of the water dam, each first rafter having opposite ends joining with the water dam, each first rafter having a middle portion being domed above the opening of the water dam and each first rafter having an interior side and an exterior side with the exterior side of the first rafter being tapered and the first rafter has ends flush with the exterior surface of the water dam, and the first rafter interior side being flush with an interior surface of the water dam, and the foreign matter ingestion preventer further including second rafters generally parallel to the second supports, the second rafters extending in a second direction over the opening of the water dam, each second rafter having opposite ends joining with the water dam, each second rafter having a middle portion being domed above the opening of the water dam and each second rafter having an interior side and an exterior side and the ends of the second rafter being flush with the interior and exterior surfaces respectively of the water dam, and the second rafter exterior side being tapered, the second rafters intersecting with the first curvilinear supports and rafters, and wherein the area of the foreign matter ingestion preventer minus the surface defined by the transverse dimension of the area of the first and second supports and first and second rafters is equal or greater to the area defined by the opening of the water dam.

17. A high temperature injection molded polymeric rainhat as described in claim 14, wherein there is an axis of travel of airflow through the rainhat and the first and second supports project a rectangular image on a plane which is perpendicular to the axis of travel of airflow through the rainhat.

18. A high temperature injection molded polymeric rainhat as described in claim 1 wherein the rainhat flange, water dam and foreign matter injection preventer are made in a single draw injection mold machine.

* * * * *